United States Patent
Kingetsu et al.

(10) Patent No.: US 6,181,379 B1
(45) Date of Patent: *Jan. 30, 2001

(54) IMAGE SENSING DEVICE WITH DIFFERENT IMAGE SENSING CHARACTERISTICS FOR DOCUMENTS AND SCENERY

(75) Inventors: Yasuhiro Kingetsu, Amagasaki; Keizou Ochi, Takatsuki, both of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/648,701

(22) Filed: May 16, 1996

(30) Foreign Application Priority Data

May 17, 1995 (JP) .................................................. 7-118519

(51) Int. Cl.[7] ............................ H04N 3/08; H04N 5/238; H04N 5/262
(52) U.S. Cl. ........................ 348/364; 348/205; 348/207; 348/239; 348/296; 358/462; 358/497
(58) Field of Search ............................ 348/98, 195, 202, 348/203–206, 207, 222, 229, 230, 239, 362–365, 99, 100, 103, 106, 108, 109, 296, 297, 298, 324; 358/462, 464, 474, 482, 483, 486, 488, 494, 497; 382/291, 292; H04N 3/08, 5/238, 5/262

(56) References Cited

U.S. PATENT DOCUMENTS

| | | | |
|---|---|---|---|
| 4,712,142 | * 12/1987 | Tomita et al. | 358/285 |
| 4,785,330 | * 11/1988 | Yoshida et al. | 355/14 R |
| 4,851,913 | * 7/1989 | Fetzer et al. | 358/206 |
| 5,424,854 | * 6/1995 | Hashimoto | 358/456 |
| 5,489,772 | * 2/1996 | Webb et al. | 250/208.1 |
| 5,585,620 | * 12/1996 | Nakamura et al. | 250/208.1 |
| 5,757,518 | * 5/1998 | Kashitani | 358/474 |
| 5,805,724 | * 9/1998 | Metcalfe et al. | 382/176 |
| 5,834,762 | * 11/1998 | Matsuda et al. | 250/208.1 |
| 6,002,429 | * 12/1999 | Ochi | 348/207 |

FOREIGN PATENT DOCUMENTS

| | | | |
|---|---|---|---|
| 4-70269 | 3/1992 | (JP) | H04N/5/225 |
| 4-70273 | 3/1992 | (JP) | H04N/5/235 |
| 4-70274 | 3/1992 | (JP) | H04N/5/235 |
| 4-70275 | 3/1992 | (JP) | H04N/5/235 |
| 4-70279 | 3/1992 | (JP) | H04N/5/238 |
| 4-70283 | 3/1992 | (JP) | H04N/5/335 |
| 4-70284 | 3/1992 | (JP) | H04N/5/335 |

* cited by examiner

Primary Examiner—Wendy Garber
Assistant Examiner—Ngoc-Yen Vu
(74) Attorney, Agent, or Firm—Burns, Doane, Swecker & Mathis, LLP

(57) ABSTRACT

An image sensing device, such as an electronic camera, has different operating modes that are suited for sensing images of documents and sensing images of landscapes and the like. In the document mode, since information in the document is important, the image sensor is set at a maximum resolution. In the landscape mode, the resolution is varied in accordance with image brightness, to optimize the exposure conditions. Additional image processing is carried out in the document mode to enhance the sensed image and increase the efficiency with which memory is utilized.

18 Claims, 14 Drawing Sheets

IMAGE SENSING DEVICE WITH DIFFERENT IMAGE SENSING CHARACTERISTICS FOR DOCUMENTS AND SCENERY

BACKGROUND OF THE INVENTION

The present invention pertains to various types of image sensing devices that convert an object image into electronic data.

1. Description of the Prior Art

In general, compact video cameras and electronic still cameras are constructed such that the object image is converted into electric signals using an area sensor (a two-dimensional image sensing device). Further, line scanning-type cameras, in which a line sensor (a one-dimensional image sensing device) and a scanning mechanism such as a mirror rotation mechanism are combined, have conventionally been proposed for the purpose of high resolution image sensing (see Japanese Patent Publication Hei 4-67836). A camera of this type is capable of recording the entire image of an A4 size document in a manner such that the letters in the document may be legible.

2. Issues Addressed by the Invention

If high resolution image sensing is possible, the camera can be used for the recording of text information in various documents or writing on a blackboard, in addition to such general uses as image sensing of landscapes and people, which greatly increases the usefulness of the image sensing device. However, using a conventional device, the same operation settings are used in cases where the object is a landscape as well as cases where the object is a document. In other words, in setting the operating mode, no distinction has been made between general use in which image sensing of various objects is performed in a simple manner and image sensing intended to record the information of a document as well as its image (this will be called "image sensing of documents"). Consequently, the image quality of the recorded image and the recording format of the image data have been identical regardless whether it involved image sensing of a landscape or that of a document.

The present invention was made in consideration of the above problem. Its object is to provide a highly practical image sensing device that is capable of optimizing the quality of the recorded image depending on the nature of the object.

SUMMARY OF THE INVENTION

Either a document mode or a landscape mode is selected for an electronic camera by means of a manual operation or a remote operation of switches or through automatic setting, so that the proper operating mode is set to regulate the operation of the device. The document mode is a mode suited to image sensing of documents, while the landscape mode is a mode suited to image sensing of landscapes.

For example, in the document mode, image sensing of the object is performed at the maximum resolution. In the landscape mode, the resolution setting is changed as necessary based on the appropriate value for exposure specified by means of light measurement or via user designation, and image sensing at the maximum resolution or other resolution is performed.

DETAILED DESCRIPTION

Figure 1:
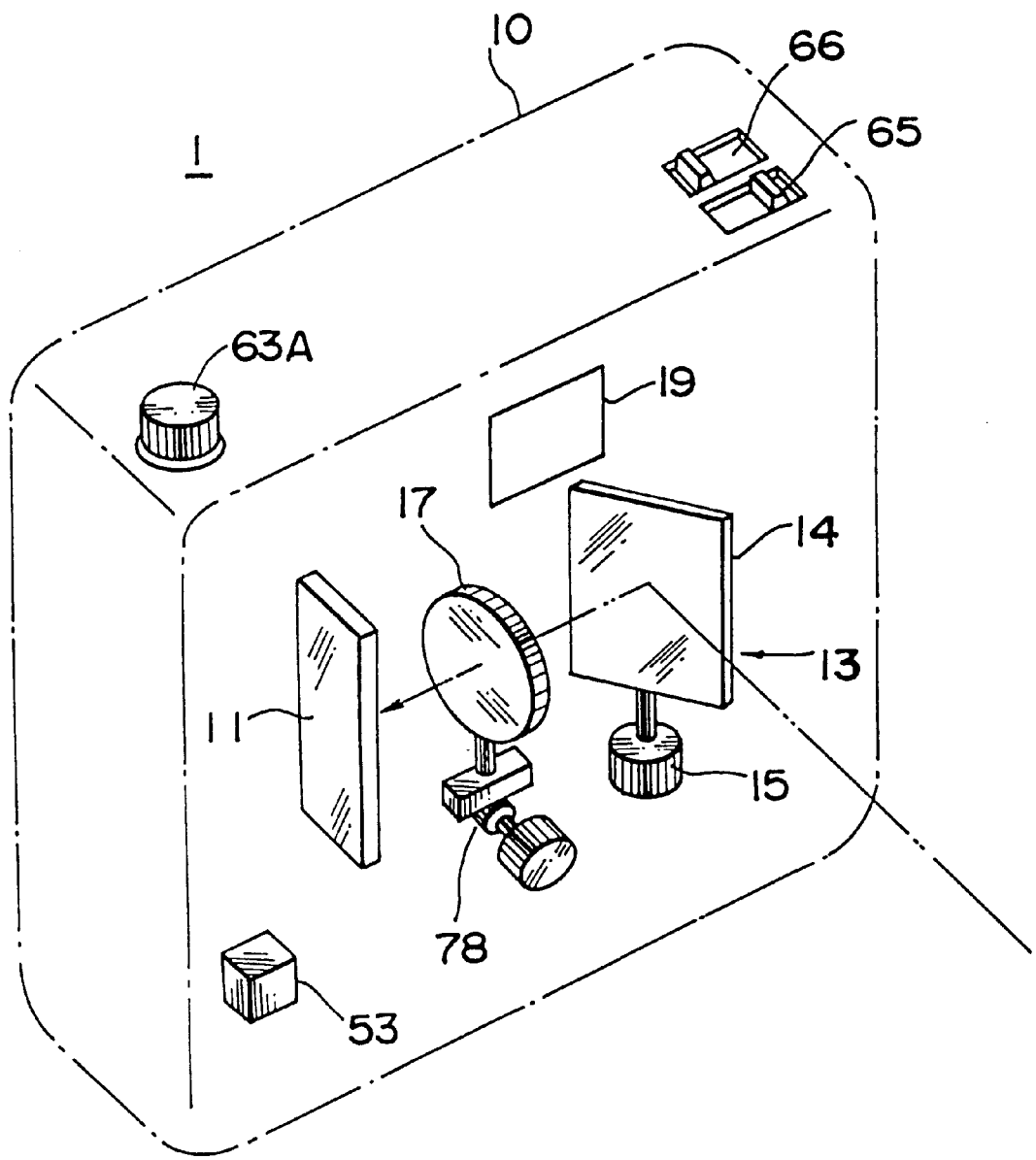
FIG. 1 shows in a simplified fashion the construction of the optical system of the electronic camera of the present invention.

FIG. 1 is a simplified drawing outlining the construction of an electronic camera 1 that can be used in the implementation of the present invention. Electronic camera 1 is a compact, lightweight line scanning-type camera having a battery as its main power source. It is equipped with color line sensor 11 comprising multiple CCDS (Charge Coupled Devices) arranged in lines, line scanning mechanism 13, image forming lens 17, electric focus adjustment mechanism 78 and viewfinder 19. Other image sensing devices may be used as line sensor 11 in place of the CCDs. Viewfinder 19 may consist of either an optical system or an electronic system employing a display device such as a liquid crystal display (LCD), and area sensors may be used in place of the line sensor.

Line scanning mechanism 13 comprises scan mirror 14 and scan motor 15 that rotates scan mirror 14. The rotational axis of scan mirror 14 is aligned parallel to the direction of the pixel arrangement in line sensor 11 (the main scan direction). The optical image of the object, which is reflected off scan mirror 14 and projected onto line sensor 11 by means of lens 17, is scanned, while being moved via the rotation of scan mirror 14, in a direction perpendicular to the main scan direction (the subscan direction) and read by line sensor 11 line by line. Image signals corresponding to the red, green or blue components of the image are then generated.

Release button 63A that comprises an image sensing instructing means, as well as first and second mode switches 65 and 66 that comprise an image sensing mode switching means, are located on the upper surface of housing 10. In addition, blur sensor (angular speed sensor) 53 is built into electronic camera 1 of this embodiment as a means to detect camera shake.

Figure 2:
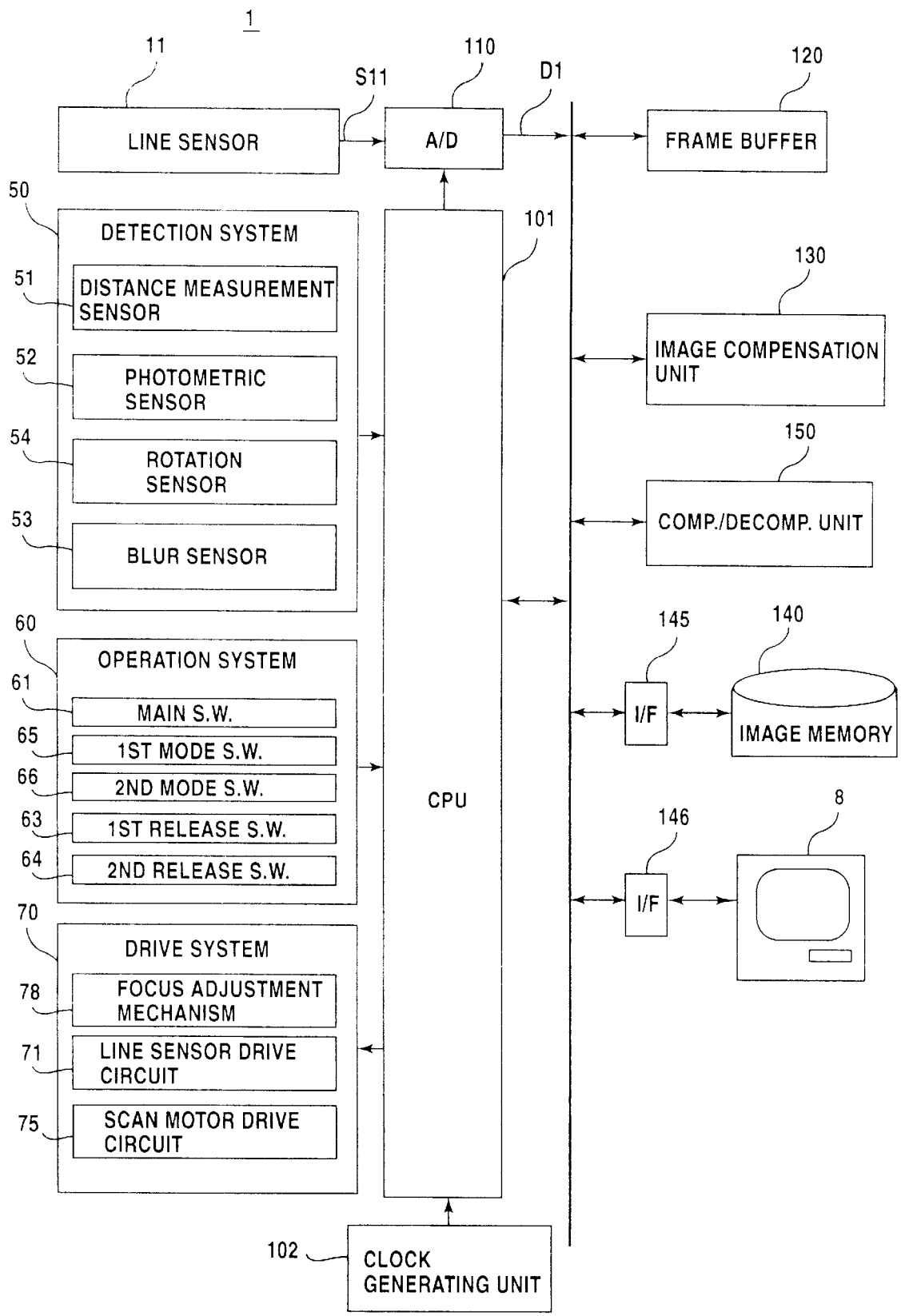
FIG. 2 is a functional block diagram of important parts of an electronic camera.

FIG. 2 is a block diagram of the control circuit of electronic camera 1. Electronic camera 1 is controlled by microprocessor unit CPU 101. Operating switches 61 and 63 through 66, which comprise operating system 60, and various types of sensors 51 through 54, which comprise detection system 50, are connected to the input ports of CPU 101. CPU 101 performs control of drive system 70, in accordance with input signals from these switches and sensors. For example, CPU 101 detects the angular displacement and rotation speed of scan motor 15 by means of scan sensor 54, outputs a corresponding control signal to scan motor drive circuit 75, and sets the scanning speed in the subscan direction at the optimal value.

In electronic camera 1, when the release button 63A is pressed, first release switch 63 turns ON. In response to first release switch 63 turning ON, automatic focus adjustment is performed by focus adjustment mechanism 78, based on the output from distance measurement sensor 51. When release button 63A is pressed down further, second release switch 64 turns ON. In response to second release switch 64 turning ON, scanning of the object image is performed by line scanning mechanism 13, line sensor 11 is driven by line sensor drive circuit 71, and the object image is sequentially read one line at a time.

Line sensor 11 simultaneously latches image signals for pixels of one line in synchronization with a shift gate signal provided from line sensor drive circuit 71 at each line cycle (ts), and outputs the image signals to A/D converter 110 in the order of the arrangement of the pixels. An image signal is obtained by performing photoelectric conversion of the total amount of light incident onto a pixel (exposure amount) during exposure time (t), and indicates the integration value of the illuminance of the light receiving surface of the pixel. Exposure time t is set based on the result of light measurement as described below.

A/D converter 110 performs shading compensation, amplification and other processing with regard to image signals S11 from line sensor 11, digitizes post-processing image signals S11 into digital signals, each of which is of a prescribed number of bits (for example, eight bits) per pixel, in synchronization with pixel clocks, and thereby obtains image sensing data D1.

Image sensing data D1 is temporarily stored in frame buffer 120 that is capable of storing image sensing data D1 for two frames. When this storage takes place, compensation for optical distortion of the image caused in the scanning via the rotation of the mirror, filtering to improve image quality and other types of processing are performed to image sensing data D1 by image sensing compensation unit 130, if necessary.

After the virtual object image stored in frame buffer 120 via the storage of image sensing data D1 is compressed by compression/decompression unit 150, it is sent via interface 145 to image memory 140 comprising a secondary memory medium, and is then accumulated as recorded information regarding the object by means of electronic camera 1. It is then sent at an appropriate time from image memory 140 to external device 8 via interface 146. External device 8 may comprise an image editing device such as a personal computer, or an image reproduction mechanism such as a display or a printer. When output to external device 8 occurs, data decompression is performed by compression/decompression unit 150 if necessary.

Where image memory 140 is constructed using a removable memory medium such as a memory card, image sensing data D1 may be sent to external device 8 by removing image memory 140 from electronic camera 1 and mounting it in external device 8.

Electronic camera 1 of the construction described above has a landscape mode that is suitable for image sensing of landscapes, which is how a camera is generally used, and a document mode that is suitable for image sensing of documents. The user can designate landscape mode or document mode through operation of mode switch 65.

In this embodiment, landscape mode and document mode are characterized by the presence or absence of processes pertaining to the five functions shown in Table 1. Regarding the distortion compensation function, however, the user can select whether or not to have it through the operation of mode switch 66 in landscape mode only. The other four functions are automatically set or canceled in response to the designation of landscape mode or document mode, as shown in Table 1.

TABLE 1

| FUNCTION | DOCUMENT MODE | LANDSCAPE MODE |
| --- | --- | --- |
| SCANNING TIME LIMITATION RELAXING FUNCTION | ABSENT | PRESENT |
| RESOLUTION CHANGING FUNCTION | ABSENT | PRESENT |
| MIRROR REFLECTION PREVENTION FUNCTION | PRESENT | ABSENT |
| AREA DETERMINATION FUNCTION | PRESENT | ABSENT |
| DISTORTION COMPENSATION FUNCTION | PRESENT | PRESENT/ ABSENT |

The five functions in Table 1 will now be explained (1) Scanning Time Limitation Relaxing Function Because line scanning-type electronic camera 1 performs mechanical scanning, a longer time is required for image sensing for one frame (image sensing of the entire object image) than is required in the case of an area sensor. Therefore, image blur due to camera shake can occur easily, particularly where the camera is held by hand, even where the object is a still object. Since blur becomes more marked as the scanning speed decreases, or in other words, as the scanning time increases, an allowed limit is set for the scanning time so that the blur does not become noticeable. The more camera shake there is, the shorter this allowed limit becomes.

Incidentally, in comparison with the document mode, in which the meaning of image sensing is lost if letters, etc. are illegible, the landscape mode can accommodate a larger degree of blur. Therefore, the scanning time limit may be relaxed relative to the limit for the document mode. In other words, the scanning time may be set longer for landscape mode than for document mode.

(2) Resolution Changing Function

In the sensing of an image by line sensor 11, it is necessary to make the exposure time (t) sufficiently long when the brightness of the object is low. However, that inevitably makes the scanning time (the time required for image sensing for one frame) become long, which is disadvantageous in terms of reducing blur. In other words, there are cases where achieving both reduction in blur and optimization of exposure is difficult. In such cases, the resolution in the subscan direction, that is, the number of lines, may be reduced so that the scanning time is limited to the allowed limit.

However, a reduction in resolution is not desirable in the document mode. In many cases the object information comprises bi-level images such as letters, and a slightly insufficient exposure does not affect legibility. On the other hand, because insufficient exposure significantly affects reproducibility including tones, it is preferable to opt for operation settings in which the resolution may be reduced while exposure is optimized. In other words, it is preferable to place priority on exposure rather than resolution.

(3) Mirror Reflection Prevention Function

Mirror reflection refers to a phenomenon in which, if the surface of the object is lustrous (photographic paper, for example), the light source, such as a fluorescent light or the sun, is recorded in the recorded image. Letters and images comprising the original information may become illegible due to mirror reflection. Therefore, it is important to prevent mirror reflection in the image sensing of documents. In image sensing of landscapes, mirror reflection also comprises information in the sense that the landscape should be recorded as seen, and an object image without mirror reflection would be unnatural.

(4) Area Determination Function

In image sensing of documents, it is useful to determine whether the image is bi-level or multi-level and whether it is colored or monochrome. For example, where image sensing data is output to a bi-level image printer, if information indicating whether the image is a bi-level image or a multi-level image is stored in advance, the printing process can be enhanced. For example, by performing a simple binarizing process for bi-level image areas, and gradation reproduction processing via a method such as the dither method for multi-level image areas when the data is output, the reproduced image can be reproduced with high quality.

Furthermore, by performing a determination as to whether the image is a bi-level image or multi-level image, a smaller number of data bits for a pixel may be used for bi-level image areas, as a result of which image memory 140 can be effectively used. An optimal data compression algorithm may then be achieved by performing run length encoding for bi-level image areas and using the discrete cosine conversion method of multi-level image areas.

When performing a determination as to whether the image is colored or monochrome, only the brightness information should be recorded and information indicating hues and chromaticity can be omitted for monochrome areas, through which image memory 140 may be effectively employed.

When carrying out image sensing of landscapes, since the object image is ordinarily a multi-level color image, a determination regarding bi-level versus multi-level and color versus monochrome is meaningless. Therefore, where the landscape mode is selected, processing in connection with the area determination function is not performed.

(5) Distortion Compensation Function

Figure 15:
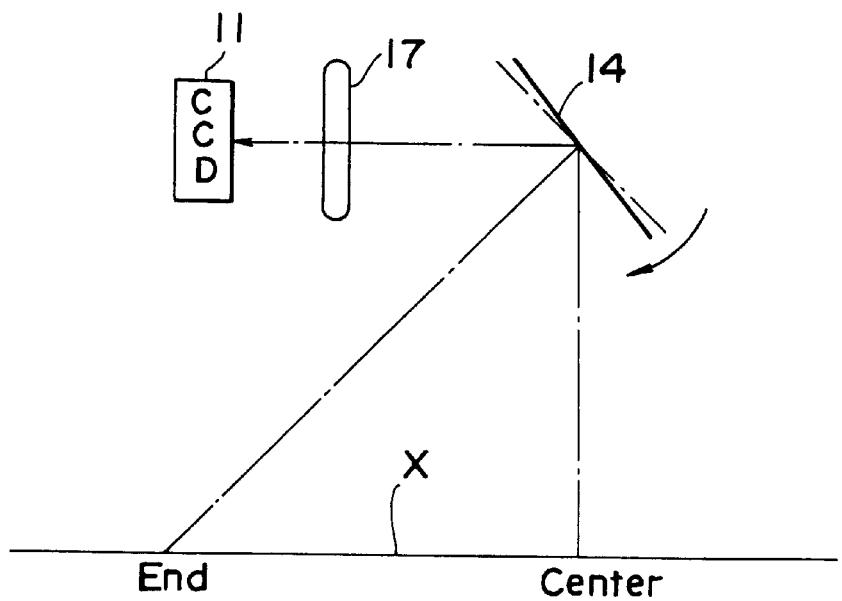
FIGS. 15(A)–15(C) shows in a simplified fashion the details of the distortion compensation process.
Figure 15:
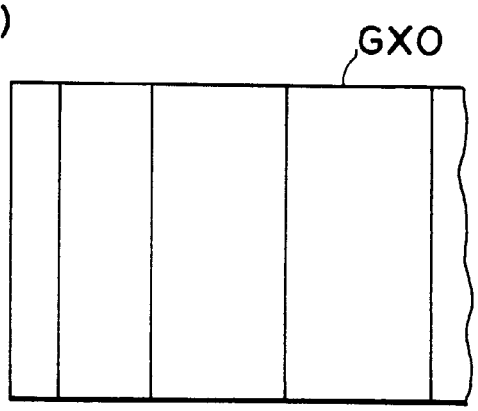
Figure 15:
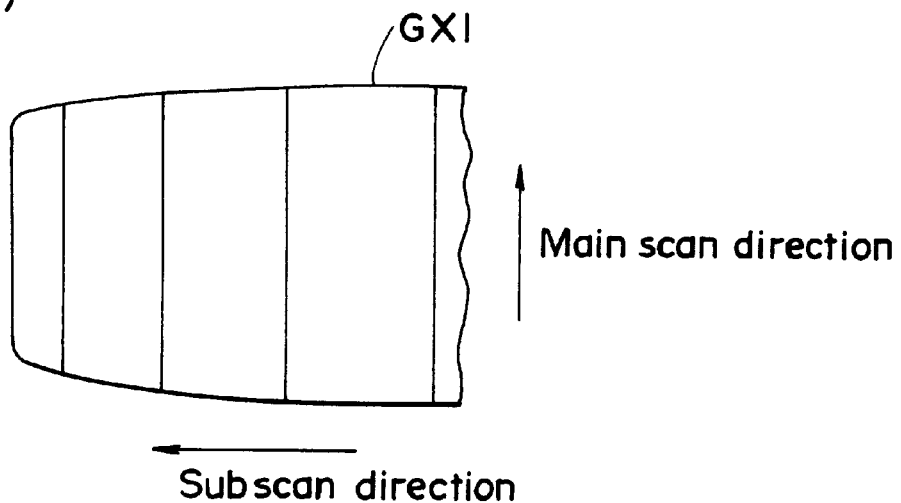

FIG. 15 shows the details of the distortion compensation process in a simplified fashion. During scanning via mirror rotation, the length of the optical path from the object (original X) to line sensor 11 varies depending on whether it is measured from the end of the object or the center of the object, as shown in FIG. 15(A). Therefore, when image sensing of original image GX0 is performed as shown in FIG. 15(B), the closer the sensed image GX1 is to the end of the original image in the subscan direction, the more it shrinks in the main scan direction, as shown in FIG. 15(C). As a result, image processing is performed in which sensed image GX1 is extended in the main scan direction line by line, using a rate corresponding to the position of the line in the subscan direction.

Such compensation is necessary regardless of whether the image sensing mode is that for documents or that for landscapes. However, when performing image sensing of landscapes, there are cases where distortion of the image is preferred, in the same way as the fisheye lens effect is preferred. Therefore, the need for the distortion compensation function is determined by the user.

The operation of electronic camera 1 is explained in detail below with reference to flow charts indicating the control sequence for CPU 101. First, the symbol, name and meaning of each operation setting value and measurement value for the control of electronic camera 1 is provided in Table 2 below. In Table 2, an asterisk indicates that the value is a variable that changes according to the image sensing conditions. In addition, in the following explanation and accompanying drawings, operation setting values or measurement values may be described by using only their symbols.

TABLE 2

| SYMBOL | NAME (*INDICATES A VARIABLE) | DESCRIPTION |
| --- | --- | --- |
| T | * Scanning time | Time required for scanning for one frame (T = ts X R) |
| T0 | Shortest scanning time | Scanning time required for one frame at fastest mirror rotation speed |
| $T_{MAX}$ | Longest scanning time | Scanning time required for one frame at slowest mirror rotation speed |
| $T_{LIM}$ | * Allowed scanning time | Scanning time corresponding to maximum allowed image blur |
| α | Limit relaxing coefficient | Coefficient for the calculation of $T_{LIM}$ in landscape mode (α>1) |
| R | Number of lines | Standard resolution in the direction of sub-scanning |
| R' | Number of lines | Non-standard resolution in the direction of subscanning (R'<R) |
| ts | * Line cycle | Scanning time required for one line (ts≧ tsO) |
| tsO | Transmission time | Time required for signal output for one line of line sensor |
| t | * Exposure time | Charge accumulation time for each line of sensor (t<ts) |
| θ0 | * Scan angle | Mirror rotation angle for one frame |
| θx | * Unit image blur angle | Amount of camera shake per unit of time in the direction of mirror rotational angle |
| ω | Rotation speed | Scan mirror rotation angular speed |
| ω0 | Maximum rotation speed | Highest scan mirror rotation angular speed |
| L | * Photometric value | Object brightness |
| L0 | Reference photometric value | Object brightness at which the appropriate value for exposure time t is equal to transmission time tsO |

Figure 3:
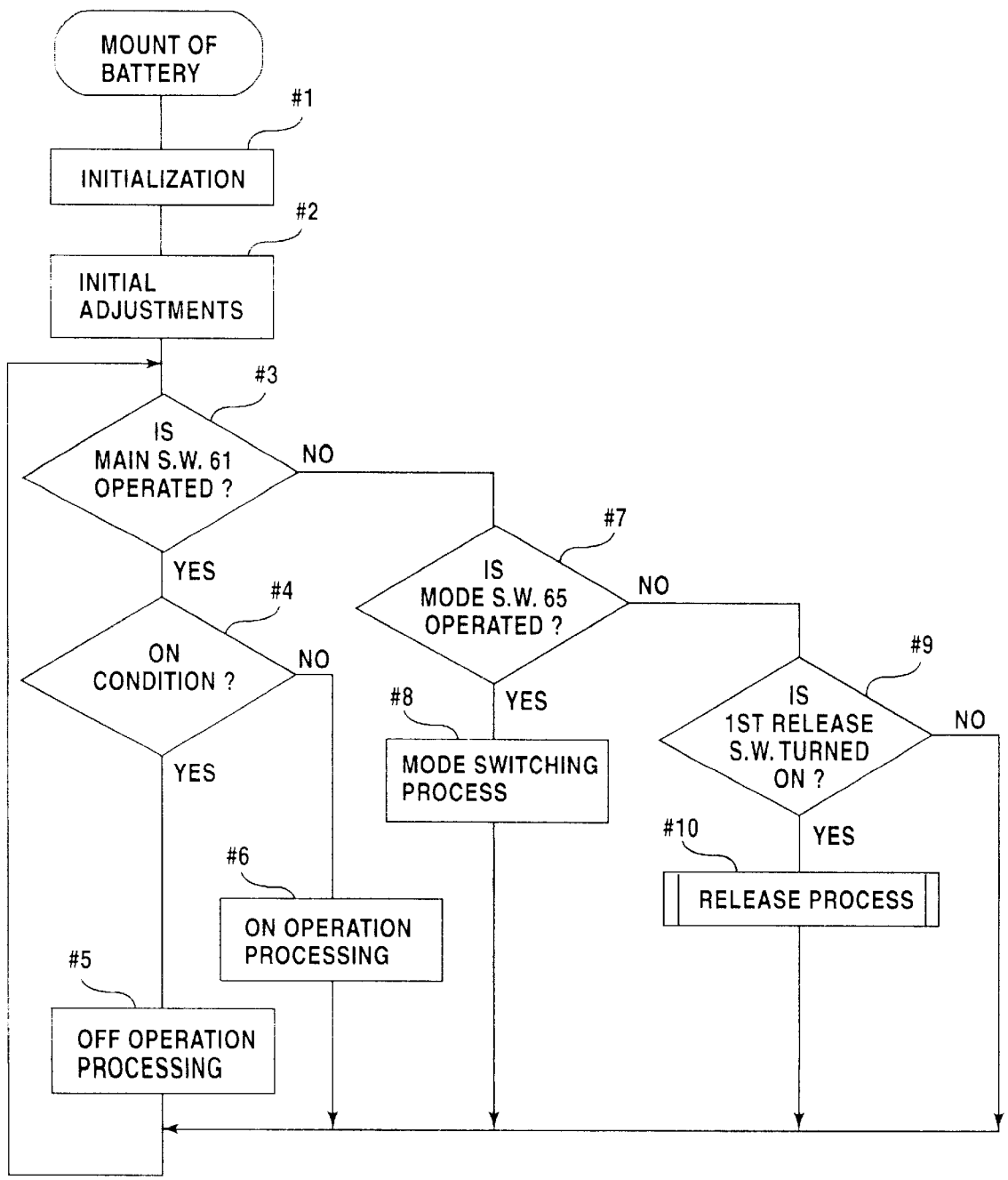
FIG. 3 is a flow chart outlining the sequence of a CPU.

FIG. 3 is a flow chart outlining the control sequence of CPU 101. When a battery is mounted in the camera and the control power supply is turned ON, CPU 101 performs initialization setting (step #1) for the various control registers, etc., as well as initial adjustments (step #2) regarding the circuit or mechanism to be controlled, and then waits for the switches to be operated.

When main switch 61 is operated, or in other words, where there is a change in the status of main switch 61, the ON and OFF states of the camera are toggled. If main switch 61 is operating in the ON condition, OFF operation processing is performed to cut off the supply of drive current to the circuit or mechanism to be controlled. If main switch 61 is not operating, ON operation processing is performed to supply drive current to the circuit or mechanism to be controlled (steps #3–#6).

When mode switches 65 and 66 are operated, a mode switching process takes place (steps #7 and #8) to set the image sensing mode to a mode corresponding to the status of the switch after its operation. If mode switch 65 is operated while the image sensing mode is set to landscape mode appropriate for the situation where the object is a landscape or a person, for example, the image sensing mode is switched from landscape mode to document mode appropriate for performing image sensing of documents. When mode switch 65 is operated again, the image sensing mode is switched to landscape mode from document mode. When release button 63A is then pressed down and first release switch 63 is turned ON, shutter release, including an operation unique to the present invention, takes place (steps #9 and #10).

Figure 4:
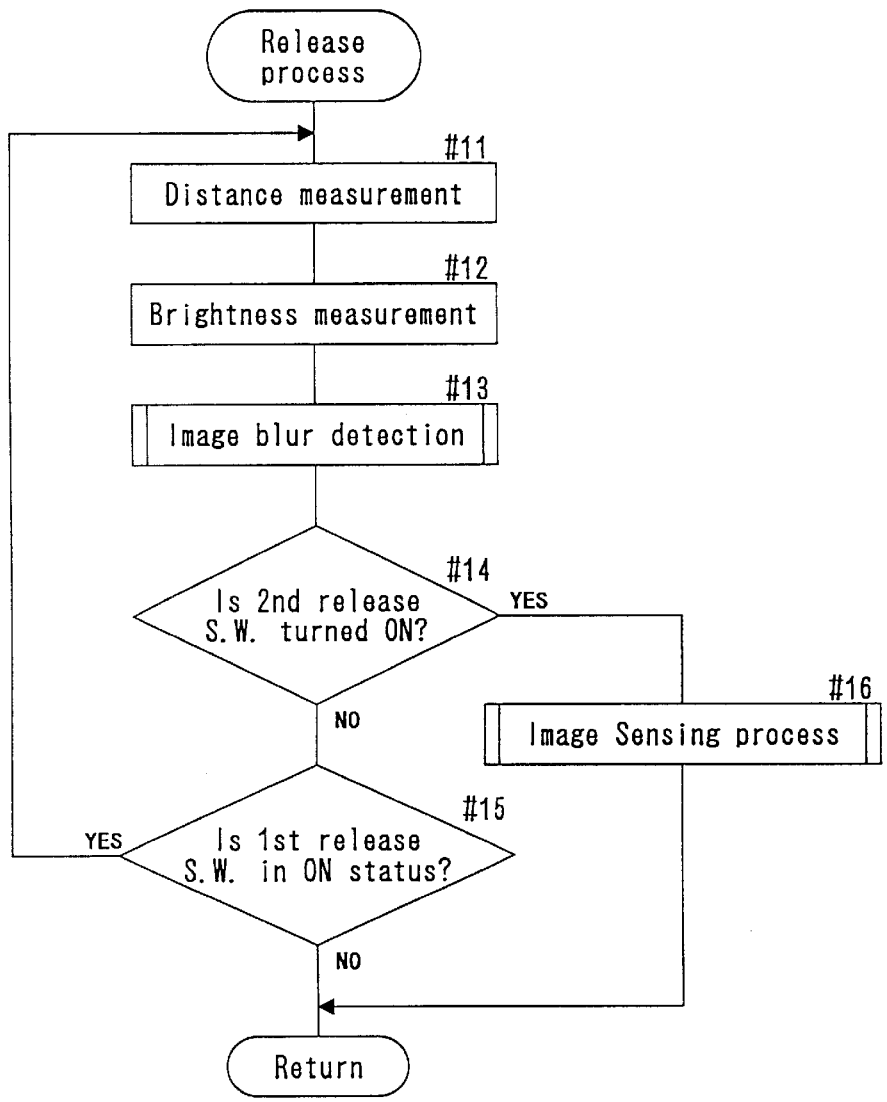
FIG. 4 is a flow chart showing the sequence of the shutter release process in FIG. 3.

FIG. 4 is a flow chart showing in detail the sequence of this shutter release process. During the shutter release process, the output from distance measurement sensor 51 is read, the distance to the object is determined, and focus adjustment mechanism 78 is controlled in accordance with the result of this distance measurement (step #11). The output from photometric sensor 52 indicating the brightness of the object is then read as photometric value L (step #12). Aperture adjustment or setting as to the need for illumination from an auxiliary light source, or lack thereof, may be performed at this time based on photometric value L.

Figure 5:
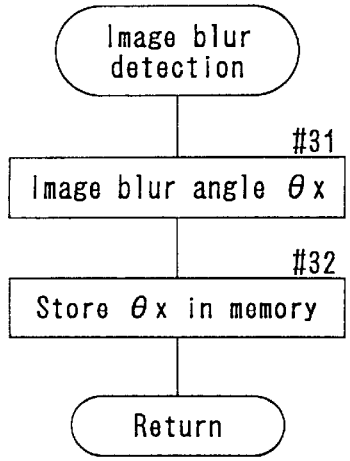
FIG. 5 is a flow chart showing the sequence of the blur detection process in FIG. 4.

Image blur detection is then performed in order to optimize the operating conditions in accordance with the amount of camera shake (step #13). Image blur detection is a process to read the output from image blur sensor 53 as image blur angle θx and store it in memory (steps #31 and #32), as shown in the flow chart in FIG. 5.

When release button 63A is pressed further and second release switch 64 is turned ON (step #14), image sensing is performed to convert the object image into image data D1 and store the data in image memory 140 (step #16). When release switch 64 is OFF, and first release switch 63 is continuously ON, distance measurement, light measurement and image blur detection are repeated.

Figure 6:
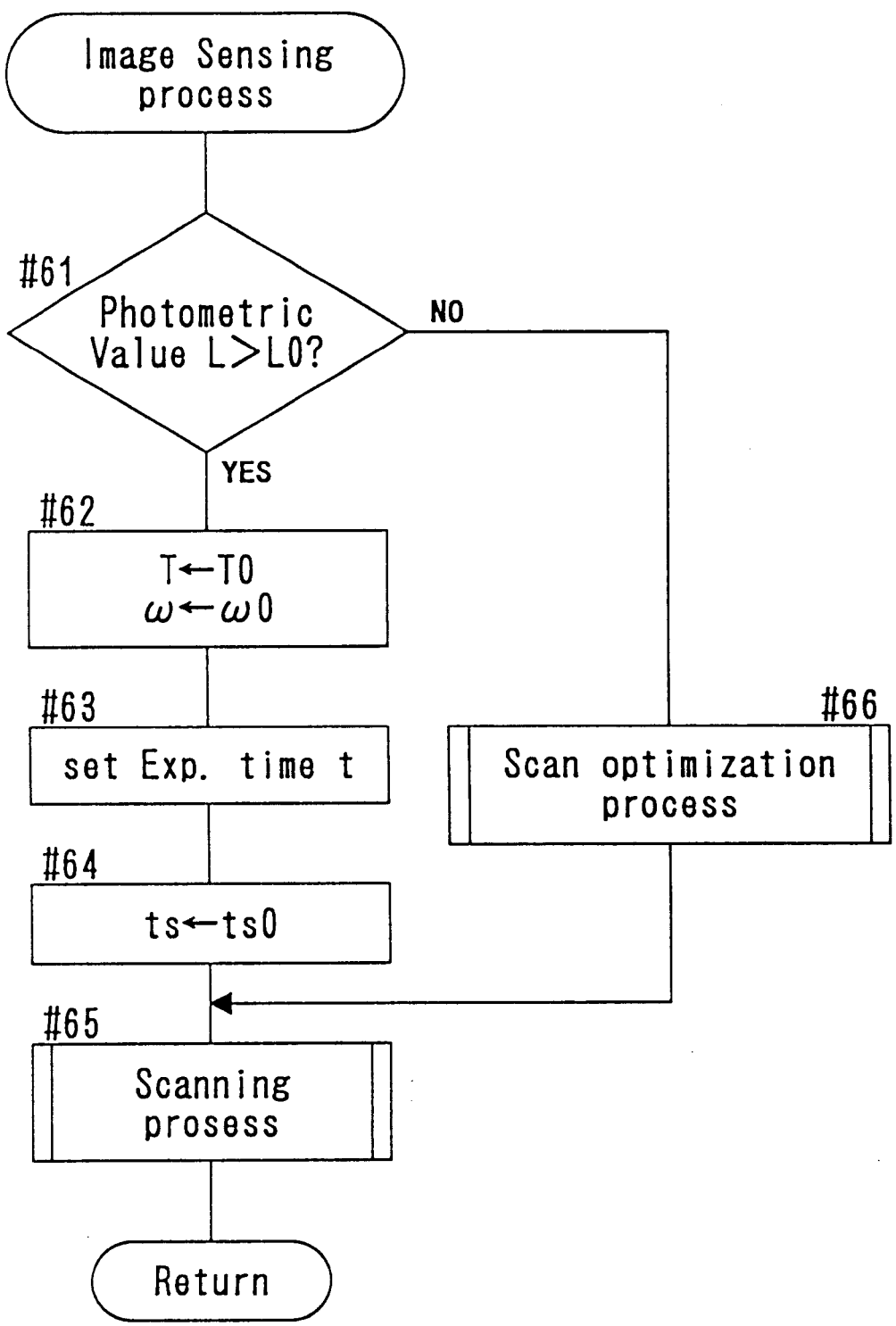
FIG. 6 is a flow chart showing the sequence of the image sensing process in FIG. 4.
Figure 7:
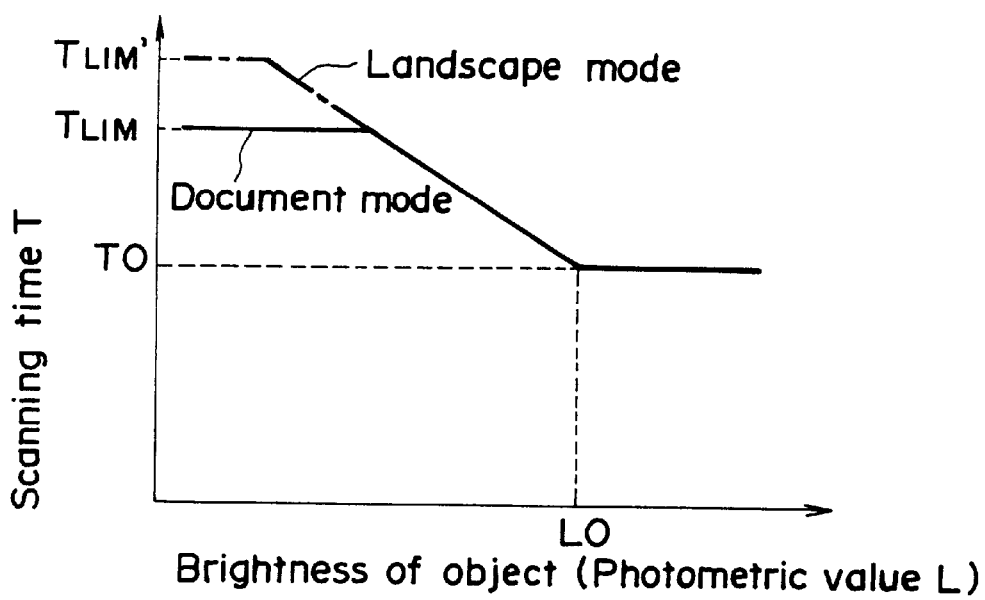
FIGS. 7(A)–7(B) is a graph showing scanning control characteristics.
Figure 7:
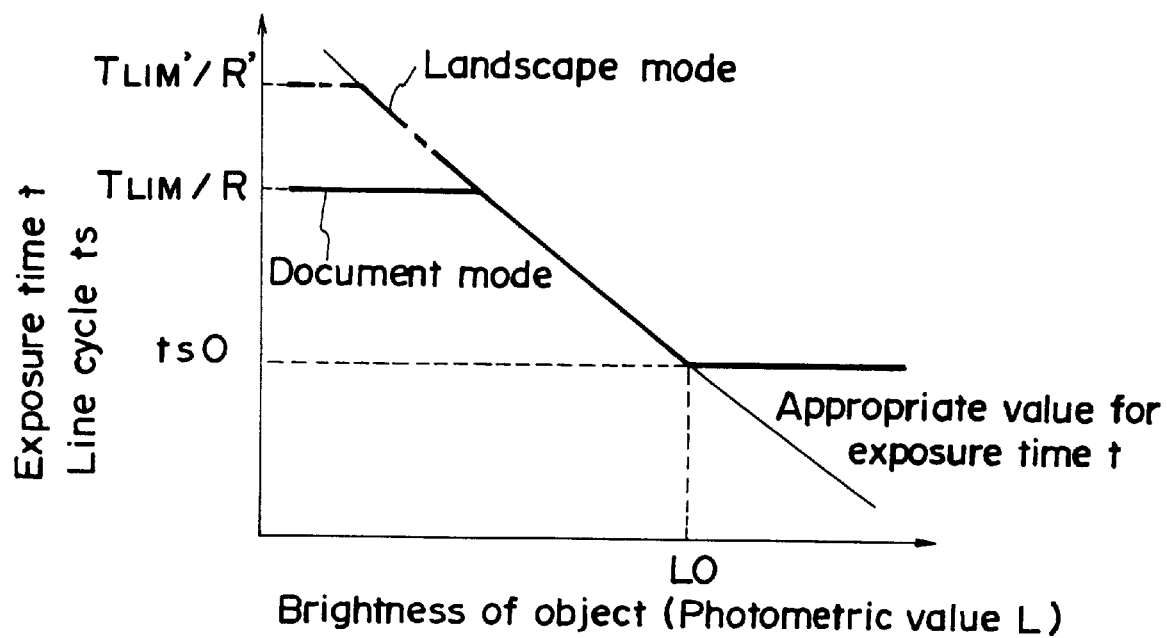

FIG. 6 is a flow chart showing in detail the sequence of the image sensing process of FIG. 4. In the image sensing process, a determination is first made whether or not the value of photometric value L is larger than reference photometric value L0 (step #61). Reference photometric value L0 is related to the characteristics of the line sensor. When image sensing is performed by line sensor 11, it is necessary to set the length of exposure time t for photoelectric conversion of the object image to the appropriate value. The thin line in FIG. 7(B) shows the relationship between the brightness of the object (photometric value L) and exposure time t, and shows that the brighter the object is, the smaller the appropriate value for exposure time t becomes. Reference photometric value L0 is the photometric value L at which the appropriate value for exposure time t is equal to transmission time ts0. Transmission time ts0 is a fixed minimum amount of time necessary to send image signals for one line of line sensor 11, and is defined by the drive frequency and the number of pixels in one line. Therefore, line cycle ts cannot be shorter than transmission time ts0 (ts≧tS0).

Where the answer in step #61 in FIG. 6 is YES, in other words, where L>L0 (L≧L0 is also acceptable), the appropriate value for exposure time t is shorter than transmission time ts0. Therefore the line cycle time ts is set to transmission time ts0, which is the lower limit for the value of line cycle time ts.

Therefore, the shortest scanning time T0 is set as scanning time T comprising the image sensing time for one frame, and at the same time, the fastest rotation speed (ω0 is set as rotation speed w of scan mirror 14 (step #62). The appropriate exposure time t (in this case t<ts0) corresponding to photometric value L is then obtained, and is set as a timing condition for ending photoelectric conversion during line cycle time ts (step #63). In this embodiment, there is a data ROM in which the photometric value L and the appropriate value for exposure time t are related to each other, so that exposure time t may be determined using the look-up table method. In addition, transmission time ts0 is set as the line cycle time ts (step #64).

On the other hand, where the answer in step #61 is NO, in other words where L≦L0, the appropriate value for the exposure time t is transmission time ts0 or greater. Therefore, scanning cannot be performed at the maximum scanning speed in order to avoid excess or insufficient exposure. As a result, scan optimization in which the operation settings are changed in accordance with the amount of camera shake is performed (step #66), and rotation speed, exposure time t and line cycle time ts are set. This process will be described in detail below.

The scanning process to drive line sensor 11 and line scanning mechanism 13 in accordance with the operating conditions set in these steps #62–#64 and #66 is then carried out (step #65). Where the result of light measurement is that L>L0 as described above, scanning is performed at the maximum speed most advantageous from the standpoint of preventing image blur.

Figure 8:
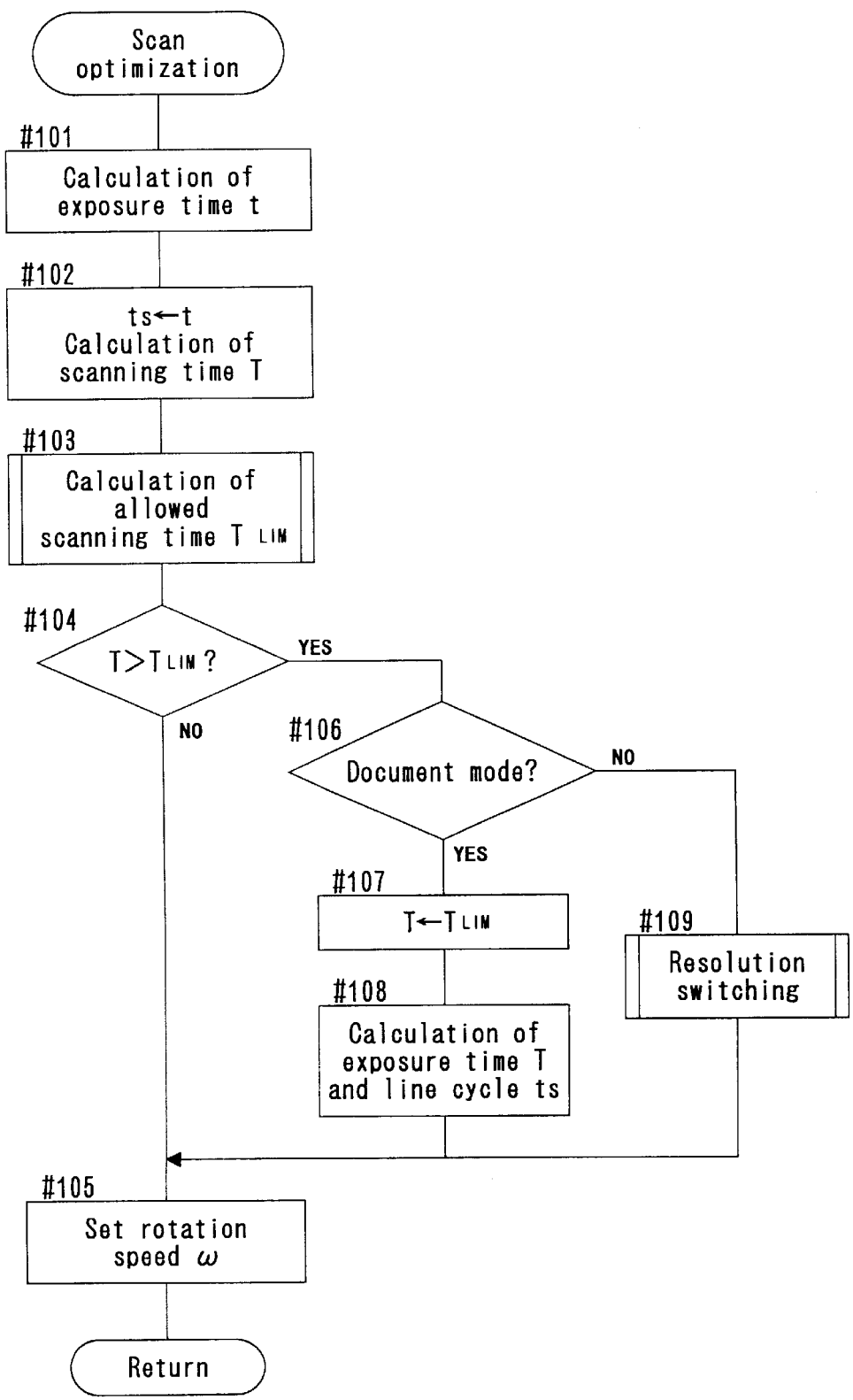
FIG. 8 is a flow chart showing the sequence of the scanning optimization process in FIG. 6.

FIG. 8 is a flow chart showing in detail the sequence of the scan optimization process (step #66) of FIG. 6. First, an appropriate exposure time t corresponding to the photometric value L (t≦ts0 in this case) is determined (step #101). The exposure time t thus obtained is then deemed the line cycle time ts and scanning time T is calculated (step #102). Scanning time T is the product of line cycle time ts and the number of lines R (T=ts X R).

Next, the allowed scanning time $T_{LIM}$ taking into account camera shake, is calculated (#103). Here, the allowed scanning time $T_{LIM}$ is the longest scanning time T at which the degree of blur of the object image is within the range allowable in actual practice, and the larger the amount of camera shake, the shorter the allowed scanning time $T_{LIM}$ becomes.

In this embodiment, the allowed scanning time $T_{LIM}$ is set so that the amount of displacement of line sensor 11 with regard to the object image during exposure does not exceed the line width, or in other words, the amount (angle) of camera shake during exposure does not exceed the angle of rotation of the mirror for one line. This is because if the amount of displacement exceeds the line width, information regarding the line as to which image sensing should be performed would be completely lost.

The amount of camera shake during exposure is equal to θx X t (=θx X ts), and the angle of rotation of the mirror for one line is equal to θ0/R. Therefore, the allowed scanning time $T_{LIM}$ is set so that formula (1) is satisfied.

$$\theta x \, X \, ts = \theta 0/R \quad (1)$$

Because the line cycle time ts is equal to T/R (that is, $T_{LIM}/R$), the allowed scanning time $T_{LIM}$ is expressed by formula (2).

$$T_{LIM} = \theta 0/\theta x \quad (2)$$

Figure 9:
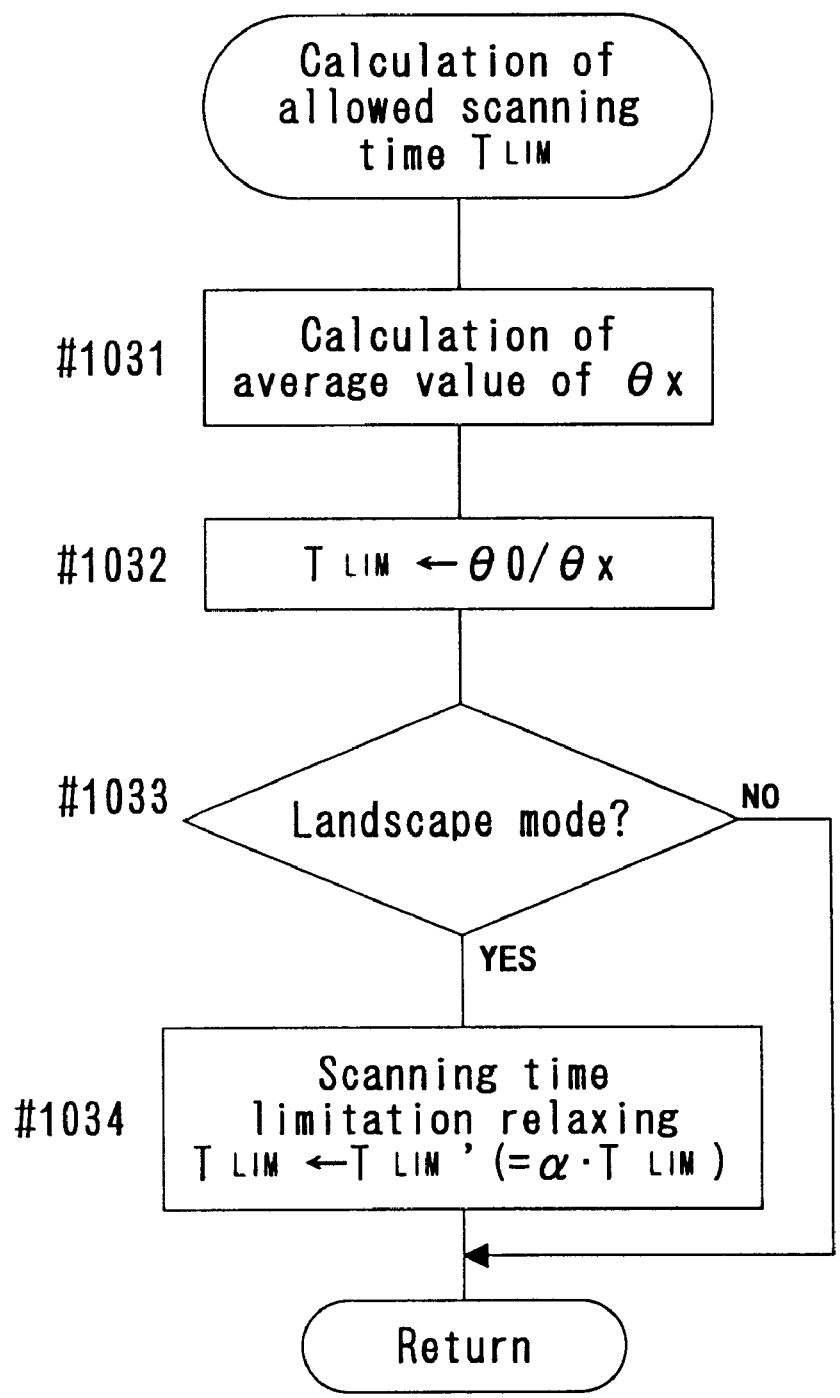
FIG. 9 is a flow chart showing the sequence of the $T_{LIM}$ calculation process in FIG. 8.

FIG. 9 is a flow chart showing the sequence of the process for calculating $T_{LIM}$ in FIG. 8. First, in the process of step #13 above, the average value of θx prior to the start of scanning is determined, and calculation of $T_{LIM}$ is performed according to formula (2) based on the average value (steps #1031 and #1032). Where the focal distance for image formation changes due to the attachment of a zoom lens or the changing of lenses, the value of θ0 (the scan angle) is set accordingly. Normally, the longer the focal distance, the more noticeable image blur becomes. However, because θ0 becomes smaller and $T_{LIM}$ becomes accordingly shorter as the focal distance increases, image blur does not increase. In other words, the scan conditions matching the focal distance are automatically set.

The operating mode is then checked (step #1033), and where it is the landscape mode, the value of the allowed scanning time $T_{LIM}$ is replaced with a value ($T_{LIM}'$) obtained by multiplying the allowed scanning time by a coefficient α (step #1034). This procedure comprises the scanning time limitation relaxing function. Coefficient α is set to be a value larger than 1 (1<α≦3, for example). In other words, in this embodiment, the allowed scanning time $T_{LIM}$ is longer in the landscape mode than in the document mode.

When the allowed scanning time $T_{LIM}$ is obtained in this way, the process returns to the sequence shown in FIG. 8, and the allowed scanning time $T_{LIM}$ and scanning time T, previously derived in step #102 from the standpoint of obtaining the appropriate exposure, are compared (step #104).

Where scanning time T does not exceed the allowed scanning time $T_{LIM}$, there is no significant influence from camera shake, and therefore rotation speed ω corresponding to scanning time T is calculated, and the result is set as a drive condition for scan motor 15 (step #105). Here, the line cycle time ts increases or decreases in accordance with the photometric value L as shown in FIG. 7(B). Scanning time T equals R times the length of line cycle time ts.

Conversely, if scanning time T does exceed the allowed scanning time $T_{LIM}$, a determination is made whether or not the document mode is set (step #106). This document mode is set by operating mode switch 65, as described above.

If the camera is set to the document mode, the absence of image blur and a prescribed resolution (the standard number of lines R) are required in order to ensure the legibility of letters. Therefore, the value of scanning time T is replaced with the value of allowed scanning time $T_{LIM}$ (step #107). Line cycle time ts and exposure time t corresponding to scanning time T are then determined again, and the results are set as drive conditions for line sensor 11 (#108). Rotation speed ω corresponding to scanning time T ($=T_{LIM}$) is then set in step #105. Here, line cycle time ts is limited by $T_{LIM}$/R as shown in FIG. 7(B), and becomes shorter than the appropriate value for exposure time t. As a result, although the object image becomes dark to the extent that exposure is insufficient, it is overall a high resolution image in which information is sufficiently legible and is not noticeably blurred.

On the other hand, where the camera is not set to the document mode, that is, where it is set to the landscape mode, the resolution switching routine (step #109) is performed, and then the process advances to step #105 where rotation speed ω is set.

Figure 10:
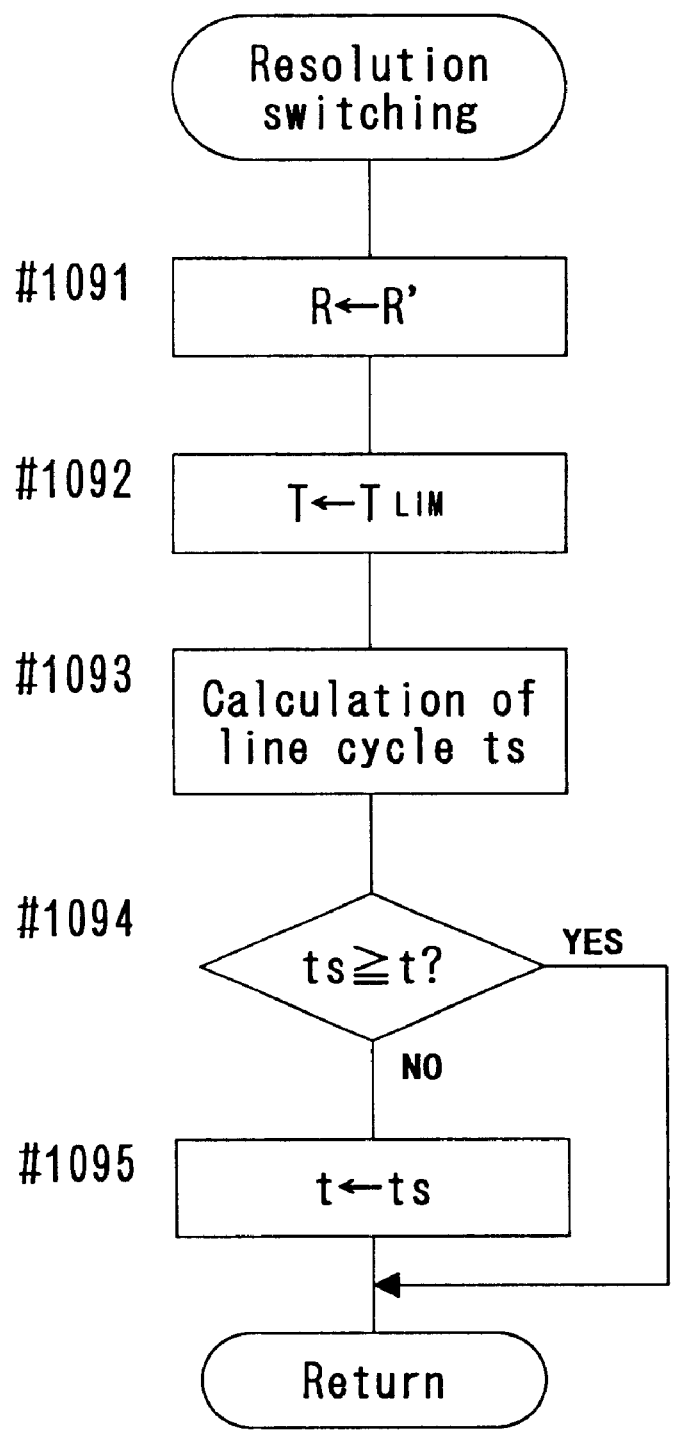
FIG. 10 is a flow chart showing the sequence of the resolution changing process in FIG. 8.

FIG. 10 is a flow chart showing the sequence of the resolution switching process in FIG. 8. In the resolution switching process, a number of lines R' smaller than the standard number of lines is set as the number of lines R (step #1091), and the allowed scanning time $T_{LIM}$ determined in step #103 in FIG. 8 is set as the scanning time T (step #1092). Line cycle time ts ($=T_{LIM}'/R'$) is then determined again (step #1093).

The line cycle time ts obtained in this manner and the previously determined appropriate exposure time t are then compared (step #1094). If t≦ts, the process returns immediately to the routine in FIG. 8. If t≧ts, the process returns to the routine after the value for t is replaced with the value for ts (step #1095).

In either case, where the resolution switching process is carried out, scanning time T is limited by $T_{LIM}$ at resolution R', as shown in FIG. 7(A). However, as shown in FIG. 7(B), line cycle time ts increases from $T_{LIM}$/R to $T_{LIM}'$/R' because of the decrease in the number of lines. As a result, even though the resolution decreases, the photometric value range widens within which image blur is avoided and exposure becomes appropriate. In other words, in the landscape mode, exposure is given priority over resolution.

Where the value of the number of lines R is changed to R', that fact is recorded as information for subsequent reproduction when the object image obtained in the scanning process is recorded. Naturally, where the number of lines R is not changed, that fact may also be recorded. In addition, where an appropriate exposure time t cannot be ensured (NO in step #1094 in FIG. 10) even though the number of lines R is changed, scanning may be stopped by issuing a warning to the user, or scanning may be performed after issuing a warning and setting t equal to ts.

Figure 11:
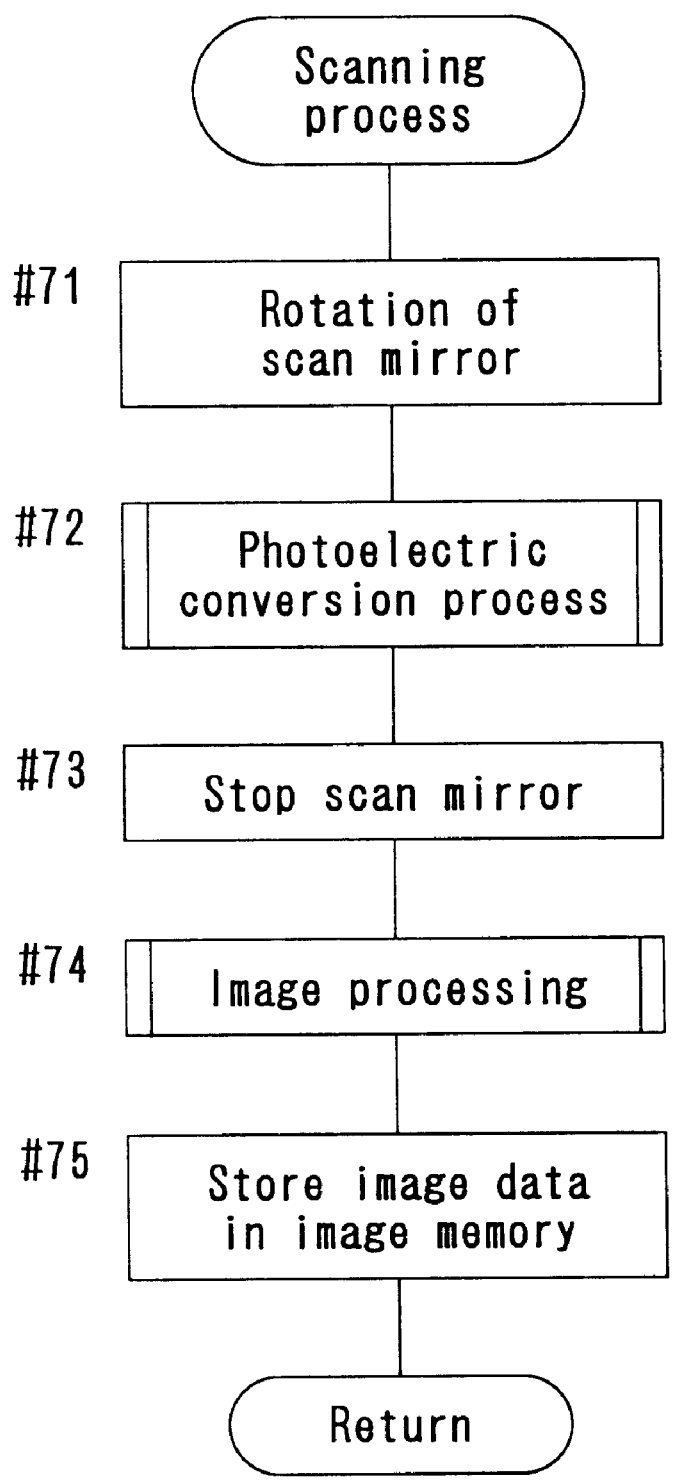
FIG. 11 is a flow chart showing the sequence of the scanning process in FIG. 6.

FIG. 11 is a flow chart showing the sequence of the scanning process of step #65 in FIG. 6. At first, in the scanning process, scan mirror 14 is rotated at rotation speed ω) set in the previous process (step #71). When the rotation is stable and the object image is projected onto line sensor 11, line sensor drive circuit 71 drives line sensor 11 by means of shift gate signals issued at the previous line cycle time ts, and reading of the image signals during a line cycle is performed (step #72). At this time, the line sensor accumulates charge during exposure time t set in the previous process and performs photoelectric conversion for each line. When the reading of the prescribed number of lines R is completed, scan mirror 14 is stopped (step #73).

Image processing is then performed, if necessary, as described above (step #74), and image sensing data is stored in image memory 140 (step #75). When image sensing of the object pursuant to the sequence described above is completed, CPU 101 returns to the main routine of FIG. 3, and electronic camera 1 enters a standby status.

Figure 12:
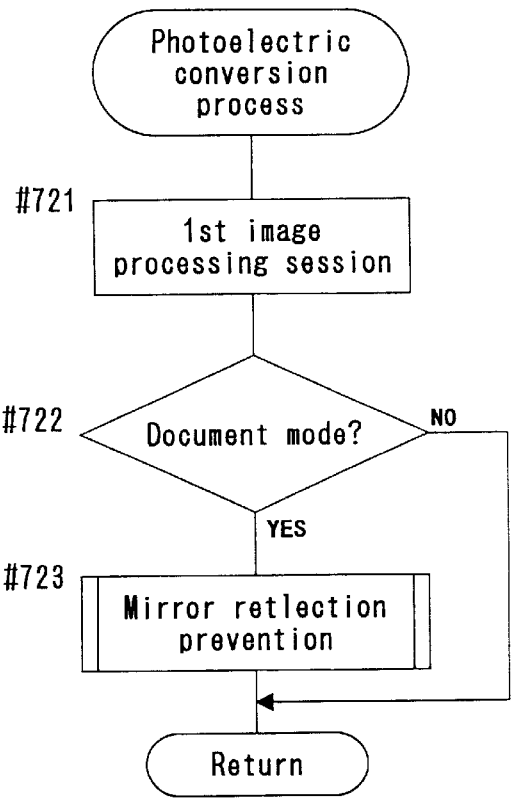
FIG. 12 is a flow chart showing the sequence of the photoelectric conversion process in FIG. 11.
Figure 13:
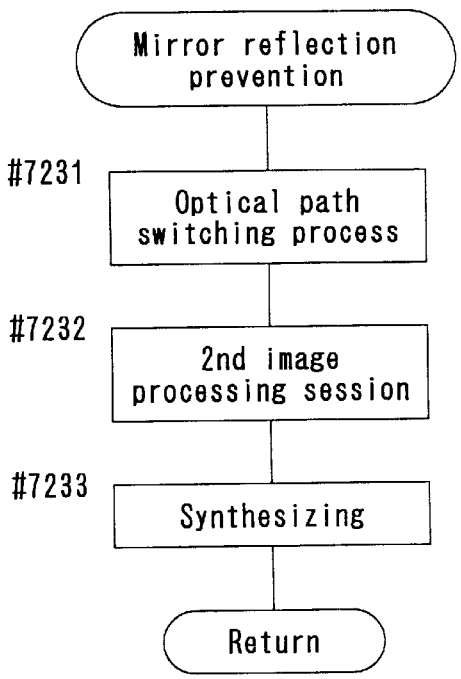
FIG. 13 is a flow chart showing the sequence of the process pertaining to the mirror reflection prevention function in FIG. 12.

FIG. 12 is a flow chart showing the sequence of the photoelectric conversion process of step #72 in FIG. 11. First, in the first image processing session, line sensor 11 is driven using line cycle time ts, and image data D1 for each pixel of the lines, of which there are a number R or R', is stored in frame buffer 120 (step #721). The operating mode is then checked (step #722) and where it is the document mode, the process pertaining to the mirror reflection prevention function takes place (step #723). FIG. 13 is a flow chart showing the sequence of the mirror reflection prevention process of step #723 in FIG. 12, and FIG. 16 shows in a simplified fashion an example of how electronic camera 1 is used.

Figure 16:
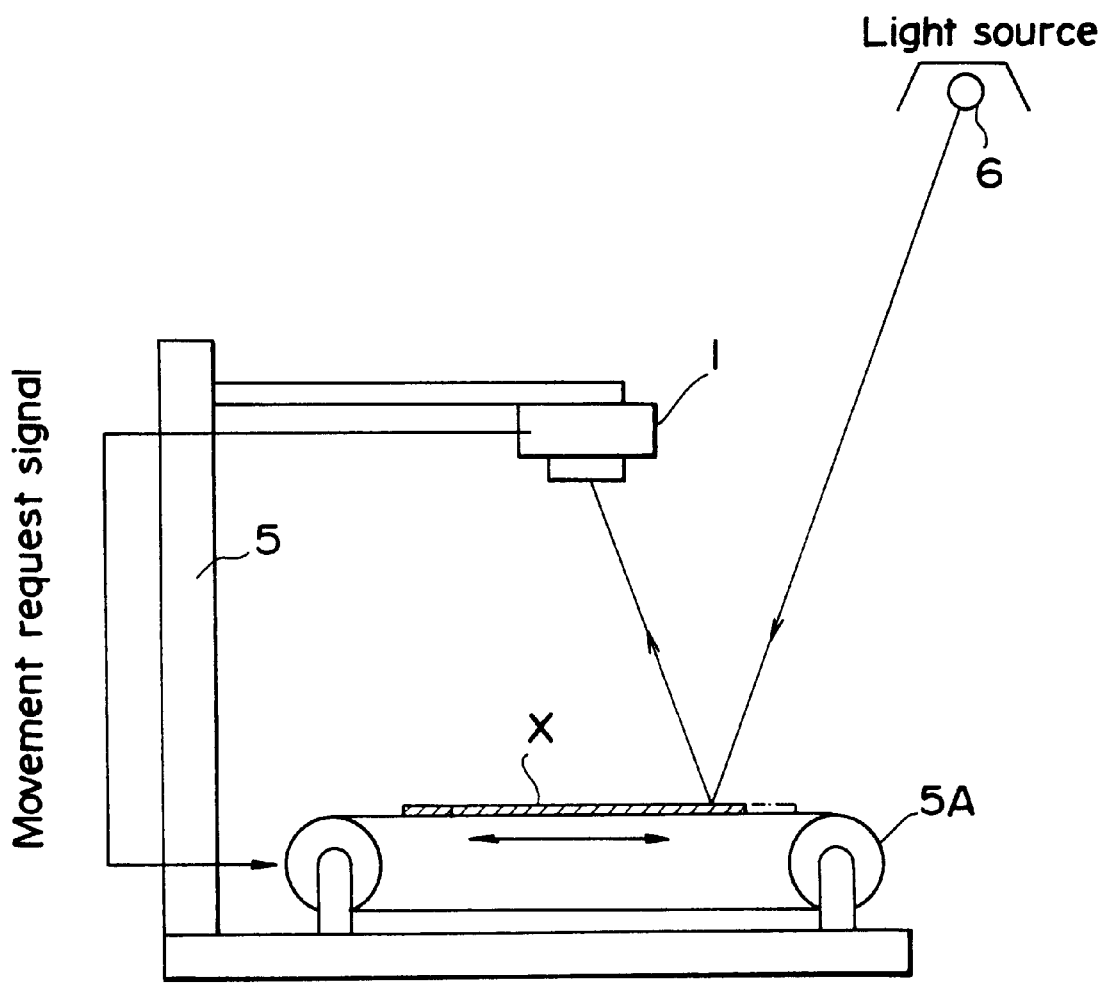
FIG. 16 shows in a simplified fashion one example of the use of the electronic camera.

In the example in FIG. 16, electronic camera 1 is attached to support device 5 for image sensing of documents. Original document table 5A of support device 5 is constructed such that it can move parallel to the surface on which the original document is placed. Original X, which is the object, is irradiated by light source 6 and the light reflected on the surface of original X enters electronic camera 1 which is located above original document table 5A. In this example, it is assumed that the first image sensing session via step #721 in FIG. 12 has already been completed.

In the mirror reflection prevention process, as shown in FIG. 13, the optical path switching process is performed (step #7231). In other words, support device 5 is requested to move original document table 5A. Upon receiving this request, support device 5 moves original document table 5A over a prescribed distance. Consequently, the relative positions of electronic camera 1 and original X change, and thus even if mirror reflection occurs, the position where mirror reflection takes place in the sensed image also changes.

After a prescribed period of time passes following the request to move, or following a notification from support device 5 that the requested movement has been completed, the second image sensing process takes place (step #7232). In other words, the second image sensing data D1 corresponding to original X is stored in frame buffer 120.

At this time, pixel shift according to the travel distance of original document table 5A is carried out so that the pixel positions of the first image sensing data D1 and the second image sensing data D1 match. At the same time, positional compensation corresponding to the change in image magnification due to the changes in distortion of lens 17 and object distance is performed. The amount of compensation is calculated based on the result of distance measurement and the travel distance of original document table 5A.

When image sensing data D1 for two frames pertaining to one document X is obtained in this way, image sensing data D1 for a single composite frame is generated by synthesizing the original data of the two frames (step #7233). In other words, because the object brightness is high where mirror reflection occurs, the data values are compared for each pixel and the smaller image sensing data D1 is used as the information to be recorded. Through this process, image sensing information can be obtained from which influence by mirror reflection is eliminated.

However, when there are fluctuations in the pixel data values caused by noise in the image sensing system in areas where mirror reflection is not occurring, data values for the first image sensing session and for the second image sensing session could be alternately employed, which would generate a texture that does not actually exist. Consequently, a method of data synthesis may be used in which the data values from one of the two image sensing sessions (data values for the first session, for example) or the average values of data from the first and second sessions is used in principle, and where the difference between the data values for the first and second sessions exceeds a prescribed level, the smaller data value is employed.

Figure 14:
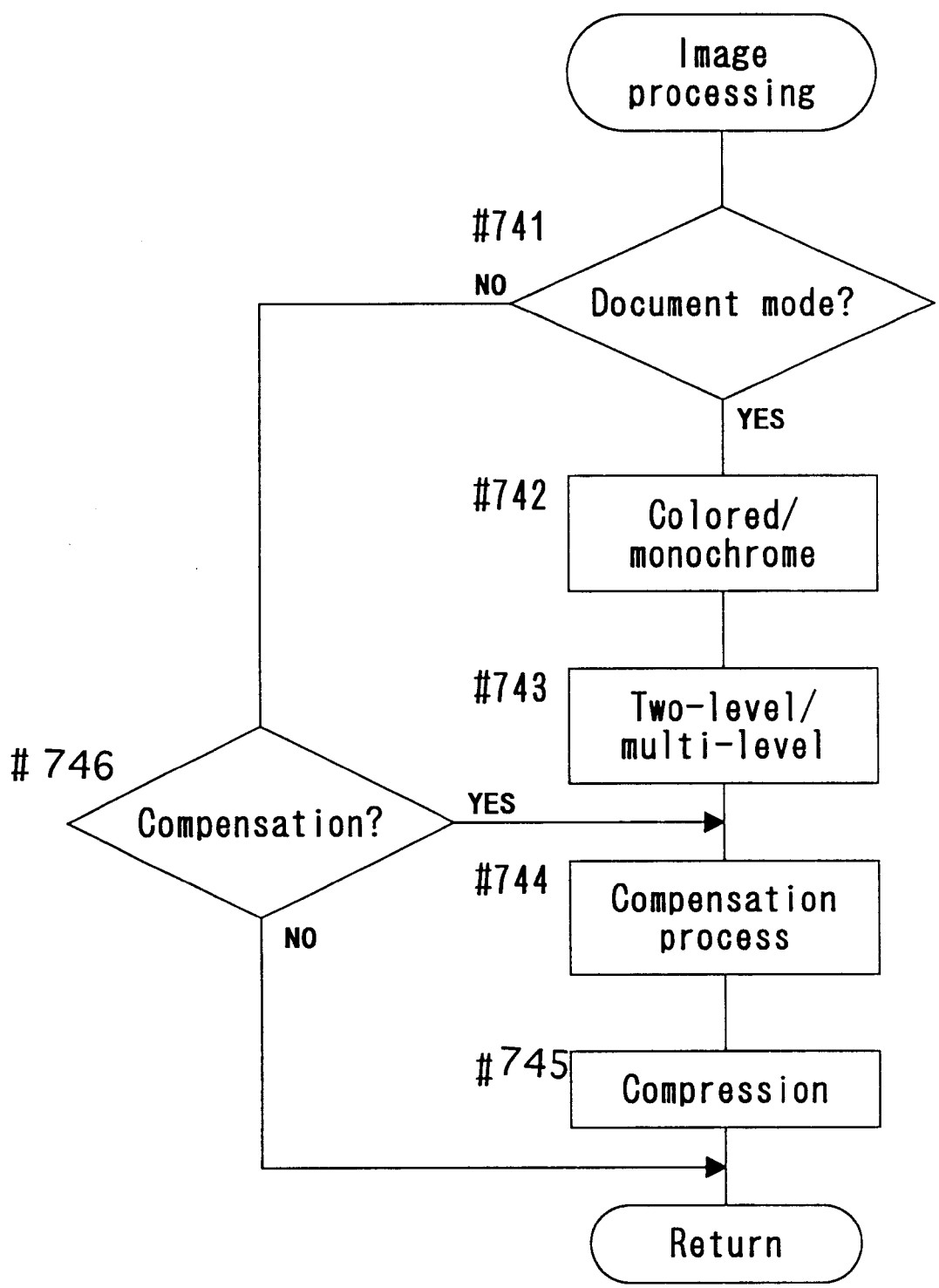
FIG. 14 is a flow chart showing the sequence of the image processing routine in FIG. 11.

FIG. 14 is a flow chart showing the sequence of the image processing of step #74 in FIG. 11. In this image processing, first, the operating mode is checked (step #741). If it is the document mode, the two processes pertaining to the area determination function, i.e., a process to determine whether the image is colored or monochrome and a process to determine whether the image is a bi-level image or multi-level image are executed (steps #742 and #743). In other words, in step #742, a determination is made whether or not the image data is for a black and white image (monochrome image) or a color image. Where it is determined as a result of this determination that the image is a monochrome image, it is determined in step #743 whether the image data is for a bi-level image which does not have tones between black and white (i.e., tones other than that used in letters and lines), or for a multi-level image which has gradations like a photograph. Then a compensation process pertaining to the distortion compensation function is carried out (step #744).

On the other hand, if the mode is the landscape mode, a determination is made whether or not execution of the distortion compensation function by means of mode switch 66 is required (step #746). Where the distortion compensation function is required, the compensation process of step #744 is performed.

When distortion compensation is completed, compression is then carried out (step #745). Specifically, where it is determined in the processes of steps #742 and #743 that the sensed image data is for a monochrome bi-level image, only the brightness information (gradation information) is extracted from the image data. This is then processed via bi-level simplification using a prescribed threshold value so that it is replaced with black or white information, each pixel having one bit. The data is then compressed by means of run length encoding and is saved in image memory 140 in step #75. Where the image data is determined to be for a monochrome multi-level image, only the brightness information (gradation information) is extracted from the image data. This information is compressed by means of the discrete cosine conversion method and is stored in image memory 140 in step #75. Where the image data is determined to be for a color image, compression is performed by means of the discrete cosine conversion method for each color (red, green and blue) and is saved in image memory 140 in step #75. Where the image data is sensed in document mode, it is uniformly determined that the image data is for a color image and compression is performed for each color (red, green and blue) by means of the discrete cosine conversion method. The image information is then saved in image memory 140 in step #75.

Using the embodiment described above, regardless of the fact that the camera is a line scanning-type camera requiring a relatively long time for image sensing for one frame, a high quality object image of high resolution that is not noticeably blurred can be obtained.

Using the embodiment described above, both in image sensing of landscapes or people and in image sensing of documents or photographs, information meeting the purpose of the image sensing can be recorded, which, together with the camera's portability, allows the embodiment to be used in a wide range of uses.

Using the embodiment described above, the allowed scanning time $T_{LIM}$ in the landscape mode can be optimized through the selection of coefficient α such that different maximum limits for blur may be set for image sensing of documents and for image sensing of landscapes.

Using the embodiment described above, high quality document image information that does not include an illegible portion due to mirror reflection can be obtained. The result of area determination can also be used for increasing the efficiency of data compression.

Using the embodiment described above, the necessity for distortion compensation can be set through the operation of a switch, as a result of which distorted images such as a fisheye lens image may also be recorded in addition to images accurately reflecting the object.

Using the embodiment described above, the settings regarding whether or not the functions shown in Table 1 are required are changed simply by operating one mode switch 65, which offers ease of use. If the camera is constructed such that a separate switching operation would have to take place for each function, multiple switches would need to be operated each time the document mode or the landscape mode was selected, which would complicate the operation of the camera.

In the embodiment described above, when image sensing is performed more than once in order to obtain an object image in which mirror reflection is eliminated, the relative positions of the camera and the object may be changed by rotating original document table 5A instead of moving original document table 5A in a parallel fashion. The support means of electronic camera 1 may be made movable so that the relative positions of electronic camera 1 and the object are changed by moving electronic camera 1. Moreover, an optical system with a variable optical path may be incorporated in electronic camera 1.

In the embodiment described above, as a process pertaining to the mirror image reflection prevention function, the presence or absence of mirror reflection may be determined by means of the number of pixels that exceed a prescribed threshold brightness level and a warning may be issued where mirror reflection exists, in place of the process in which an object image is synthesized from more than one object image. The user receiving the warning can change the camera angle, for example, using his own judgment and perform image sensing once again.

In the embodiment described above, an angular speed sensor is used as the blur sensor 53, but image sensing for two frames may be performed using a low resolution area sensor, and the change in relative positions of the image and the object may be detected through comparing the object images from the two frames. In this case, an area sensor may be used in the viewfinder as well.

In the embodiment described above, line scanning may also be performed by means of a mechanism that moves line sensor 11 in a parallel fashion. In addition, various other alternatives are possible for the construction of electronic camera 1 and the control operations of CPU 101.

What is claimed is:

1. An image sensing device which converts an object image into electronic signals, said image sensing device comprising:
   a scanner having a line sensor which is moved relative to the object image to scan the object image;
   a mode selector which selectively sets a document mode that is suitable for image sensing of documents and a landscape mode that is suitable for image sensing of landscapes; and
   a controller which controls said scanner so as to scan the object image at a maximum resolution when said document mode is set by said mode selector, and to select one of multiple resolutions including the maximum resolution in accordance with brightness of the object image when said landscape mode is set by said mode selector, and control the scanner so as to scan the object image at the selected resolution.

2. An image sensing device which converts an object image into electronic signals, said image sensing device comprising:
   a scanner having a line sensor which is moved relative to the object image to scan the object image;
   a mode selector which selectively sets a document mode that is suitable for image sensing of documents and a landscape mode that is suitable for image sensing of landscapes; and
   a controller which controls said scanner in accordance with the mode set by said mode selector, such that when said document mode is set by said mode selector, said controller changes the time for scanning one line of the line sensor based on a first relationship between brightness of the object image and said scanning time, and when said landscape mode is set by said mode selector, said controller changes the time for scanning one line of the line sensor based on a second relationship between brightness of the object image and said scanning time, said second relationship being different from said first relationship.

3. The image sensing device as claimed in claim 2 wherein the maximum scanning time for one line of said second relationship is greater than the maximum scanning time for one line of said first relationship.

4. An image sensing device which converts an object image into electronic signals, said image sensing device comprising:
   a mode selector which selectively sets a document mode that is suitable for image sensing of documents and a landscape mode that is suitable for image sensing of landscapes; and
   a controller which changes image sensing time for one line of an image in accordance with a first characteristic when said document mode is set by said mode selector, and changes image sensing time for one line of an image in accordance with a second characteristic when said landscape mode is set by said mode selector, said second characteristic being different from said first characteristic.

5. The image sensing device as claimed in claim 4 wherein said first and second characteristics indicate relationships between brightness of the object image and the image sensing time for one line.

6. The image sensing device as claimed in claim 5 wherein the maximum time for sensing one line of said second relationship is greater than the maximum time for sensing one line of said first relationship.

7. The image sensing device as claimed in claim 4 further comprising a line sensor which moves relative to the object image to sense the entire object image line by line, wherein said controller changes the image sensing time for one line by varying the relative speed of movement of the line sensor.

8. The image sensing device as claimed in claim 4 further comprising an image sensor and a driving circuit which provides a signal to the image sensor at each line cycle and drives the image sensor in synchronization with the signals, wherein said controller changes the image sensing time for one line by varying the line cycle of the image sensor.

9. An image sensing device which converts an object image into electronic signals, said image sensing device comprising:
   a mode setting portion for selectively setting a first mode that is suitable for image sensing of text information and a second mode that is suitable for image sensing of scenery; and
   a controller for controlling the image sensing operation so that, when the first mode is set by said mode setting portion, the object image is sensed at a fixed resolution, and when the second mode is set by said mode setting portion, the object image is sensed at a resolution which is selected from multiple resolutions which are different from each other.

10. The image sensing device as claimed in claim 9 wherein said fixed resolution for the first mode is a maximum possible resolution.

11. An image sensing device which converts an object image into electronic signals, said image sensing device comprising:
   a scanner having a sensor that is moved relative to the object image to scan the object image;
   a mode selector which selectively sets a document mode that is suitable for image sensing of documents and a landscape mode that is suitable for image sensing of landscapes; and
   a controller which controls said scanner so as to scan the object image at a maximum resolution when said document mode is set by said mode selector, and to select one of multiple resolutions including the maximum resolution in accordance with brightness of the object image when said landscape mode is set by said mode selector, and control the scanner so as to scan the object image at the selected resolution.

12. An image sensing device, comprising:
- a line sensor for converting an object image into electronic signals;
- a scanner for moving said line sensor relative to the object image to scan the object image;
- a mode setting portion for selectively setting a document mode and a landscape mode, said document mode being defined by a first function group including plural functions that are suitable for image sensing of documents, and a landscape mode being defined by a second function group including plural functions that are suitable for image sensing of landscapes; and
- a controller for controlling said image sensing device in accordance with the functions which are included in the mode set by said mode setting portion.

13. The image sensing device as claimed in claim 12, wherein one of said functions of said second function group is related to relaxing scanning time limitations, and said controller controls the image sensing device so as to set a scanning time longer for the landscape mode than the document mode when the landscape mode is set.

14. The image sensing device as claimed in claim 12, wherein one of said functions of said second function group is related to changing of scanning resolution, and said controller controls the image sensing device so as to reduce the scanning resolution to guarantee a sufficient exposure of said line sensor when the landscape mode is set.

15. The image sensing device as claimed in claim 12, wherein one of said functions of said first function group is related to prevention of mirror reflection, and said controller controls the image sensing device so as to prevent mirror reflection in the image sensing of the object image when the document mode is set.

16. The image sensing device as claimed in claim 12, wherein one of said functions of said first function group is related to determining an attribute of the object image, and said controller controls the image sensing device as to perform the determination of the attribute of the object image when the document mode is set.

17. An image sensing device, comprising:
- an image sensor for capturing an object image to convert the object image into electronic signals;
- a scanner for moving said image sensor relative to the object image to scan the object image;
- a mode setting portion for selectively setting a document mode and a landscape mode, said document mode being defined by a first function group including plural functions that are suitable for image sensing of documents, and a landscape mode being defined by a second function group including plural functions that are suitable for image sensing of landscapes; and
- a controller for controlling said scanner in accordance with the mode set by said mode setting portion;
- wherein one of said functions of said second function group is related to the number of times for capturing the object, and said controller controls the image sensor so that the number of times for capturing in said document mode is larger than the number of times for capturing in said landscape mode.

18. The image sensing device as claimed in claim 17, wherein said document mode is set by said mode setting portion, said controller controls the scanner so as to scan the object image at a maximum resolution, and when said landscape mode is set by said mode setting portion, said controller selects one of multiple resolutions including the maximum resolution so as to scan the object image at the selected resolution.

* * * * *